United States Patent
Saito

(10) Patent No.: US 6,515,853 B2
(45) Date of Patent: Feb. 4, 2003

(54) MOUNTING MECHANISM SUITABLE FOR HEAD MOUNT DISPLAY DEVICE AND HEAD MOUNT DISPLAY DEVICE USING THE SAME

(75) Inventor: Yoshihiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 09/817,036

(22) Filed: Mar. 27, 2001

(65) Prior Publication Data

US 2002/0118506 A1 Aug. 29, 2002

(30) Foreign Application Priority Data

Feb. 28, 2001 (JP) .................................... 2001-054399

(51) Int. Cl.[7] ................................................ G06F 1/16
(52) U.S. Cl. ....................... 361/681; 361/686; 349/58
(58) Field of Search ............................ 349/58; 361/679, 361/681, 686

(56) References Cited

U.S. PATENT DOCUMENTS

| | | | | |
|---|---|---|---|---|
| 5,859,762 A | * | 1/1999 | Clark et al. .................. | 361/686 |
| 6,134,103 A | * | 10/2000 | Ghanma ..................... | 361/681 |
| 6,282,084 B1 | * | 8/2001 | Goerdt et al. ............... | 361/683 |
| 6,326,955 B1 | * | 12/2001 | Ditzik ......................... | 345/173 |
| 6,353,773 B1 | * | 3/2002 | Takenaka ................... | 700/245 |
| 6,430,038 B1 | * | 8/2002 | Helot et al. ................. | 361/681 |

FOREIGN PATENT DOCUMENTS

| | | | | |
|---|---|---|---|---|
| JP | 9280247 | * | 10/1997 | ........... F16C/11/10 |
| JP | 3053061 | * | 7/1998 | ........... G02B/27/02 |

* cited by examiner

Primary Examiner—Darren Schuberg
Assistant Examiner—Yean-Hsi Chang
(74) Attorney, Agent, or Firm—Fitzpatrick, Cella, Harper & Scinto

(57) ABSTRACT

There is provided a position adjusting mechanism capable of making the adjustment of position easily and surely without an unnecessary force being transmitted to a support portion when the position of equipment is adjusted. Shafts 30 and 31 are provided with gears 31 and 33, respectively. In a state in which an unlock button 4 is not pressed, lock members 34 and 35 are urged by plate springs 36 and 37 to positions at which the rotation of the gears 31 and 33 is inhibited, respectively. When the unlock button 4 is pressed, an integrated unlock lever 38 also moves, so that parts 38a and 38b of the lever 38 intrude into square holes 34c and 35c formed in the lock members 34 and 35, respectively. The parts 38a and 38b are provided with a taper. By the intrusion of the parts, the tapers is guided to move into the square holes to move the lock members 34 and 35 against the urging forces of the plate springs 36 and 37. Thereby, the lock members 34 and 35 are moved to positions at which the rotation of the gears 31 and 33 is permitted, so that the equipment and the support portion attached to the shafts 30 and 32 can be rotated around the shaft. When the unlock button 4 is released, the button 4 is returned to the original position by a compression spring 39, so that the lock members 34 and 35 return to the original positions. Thereby, the shafts 30 and 32 are locked again.

7 Claims, 20 Drawing Sheets

MOUNTING MECHANISM SUITABLE FOR HEAD MOUNT DISPLAY DEVICE AND HEAD MOUNT DISPLAY DEVICE USING THE SAME

FIELD OF THE INVENTION

The present invention relates to a position adjusting mechanism applicable as a mounting construction for a display device, for example, in a head mount display device, and a mounting device using the position adjusting mechanism.

BACKGROUND OF THE INVENTION

A head mount display device has so far been used widely because an image can be seen easily with a wide screen, stereoscopic vision is easy, and the device can be moved together with an observer. Generally, such a head mount display device has a position adjusting mechanism for adjusting the position of display portion after the device is mounted.

FIG. 19 shows an example of a conventional head mount display device having a position adjusting mechanism. In FIG. 19, a display 100, which is the display portion, is attached to the distal end of a connecting member 112 extending from a front frame 110 constituting a head mount mechanism of the head mount display device via a support shaft 110a serving as a position adjusting mechanism. The support shaft 110a is attached so as to be rotatable against a predetermined frictional force (higher than the gravity of the display 100) with respect to the connecting member 112, and the display 100 fixed to the support shaft 110a is fixed to an arbitrary rotational position.

The head mount display device shown in FIG. 19 includes the front frame 110 which holds the display 100 as a mounting mechanism and is opposed to the front head of a wearer when the device is mounted, two side frames 101 which are attached at both ends, right and left, of the front frame 110 so as to be rotatable in the horizontal direction in a range of a predetermined angle and are opposed to the side heads of the wearer when the device is mounted, a flexible band 103 each end of which is attached to the side frame 101 so that the length thereof is adjustable, and a top frame 105 which connects the right and left side frames 101 to each other via flexible bands 106 attached so that the length thereof is adjustable and is opposed to the head top of the wearer when the device is mounted.

Also, a front pad 107 for pressing the front head of the wearer is provided on the inside in the center of the front frame 110, and a rear pad 104 for pressing the rear head of the wearer is provided on the inside in the center of the band 103.

Such a conventional head mount display device is mounted on a wearer as described below. First, knobs 102 provided on the right and left side frames 101 are moved in the direction indicated by the arrow A to adjust the length of the band 103, by which pressing forces against the front head and the rear head applied by the rear pad 104 and the front pad 107 of the head mount mechanism are adjusted. Next, knobs 108 provided on the top frame 105 is moved in the direction indicated by the arrow B to adjust the lengths of the bands 106, by which the top frame 105 is caused to abut on the head top of the wearer.

By the above-described operation, the front pad 107 provided on the front frame 110 and the rear pad 104 provided on the band 103 are pressed against the front head and the rear head of the wearer, respectively, by a fixed force, and the top frame 105 abuts on the top head, by which the display 100 connected to the front frame 110 is mounted on the head of the wearer.

Next, the wearer adjusts the optimum observation position by tilting the display 100 supported in front of eyes around the support shaft 110a.

A problem with the conventional position adjusting mechanism consisting of a combination of the support shaft 110a and the connecting member 112 is that a range in which the display 100 is movable is limited to a range around the support shaft 110a, and although the angle is adjustable, the position in the vertical direction cannot be adjusted. For this reason, if the vertical position of the display 100 is incorrect when the device is mounted, the position cannot be adjusted to the optimum position even if the display 100 is tilted. Therefore, in the example shown in FIG. 19, the vertical position must be adjusted by moving the whole of the head mount display device vertically, so that it is necessary to perform the above-described mounting operation each time the vertical position is adjusted. This poses a problem in that the adjustment of position is very troublesome.

As a solution to this problem, Japanese Patent Laid-Open No. 9-280247 has disclosed a position adjusting mechanism in which the mounting construction of the connecting member 112 and the front frame 110 shown in FIG. 20 is improved to facilitate the adjustment of vertical position of the display 100.

This position adjusting mechanism consists of support shafts 110a and 110b and a connecting member 111 as shown in FIG. 20. In this position adjusting mechanism, the front frame 110 on the mounting mechanism side is connected to the connecting member 111 via the support shaft 110b, and the connecting member 111 can be rotated around the support shaft 110b with respect to the front frame 110. The support shaft 110b, like the support shaft 110a, is attached so as to be rotatable against a predetermined frictional force (higher than the gravity of the display 100) with respect to the connecting member 111. According to this mechanism, not only the display 100 can be tilted around the support shaft 110a but also the vertical position of the display 100 can be adjusted without repeating the mounting operation.

In FIG. 20, the support shaft 110a is taken as P1, the support shaft 110b as P2, the position of observer's eye as I, and the line of sight of the observer as L1. Also, the foot of the perpendicular drawn from P1 to the line of sight L1 is taken as H, and IH is an observation distance a representing the positional relationship between the display 100 and the position of observer's eye I. The observation distance a is a value determined in designing the head mount display device.

The position of P2 on the mounting mechanism side and the position of observer's eye I depend on the shape and size of the head of an individual wearer and the condition in which the device is mounted, and is determined when the head mount display device is mounted on the head of the observer.

Therefore, when the observation distance a has an arbitrary value, the display device mounting position (support shaft) 110a (P1) is as described below.

First, since the length of P1H is a value inherent in the display device, if IH=a is determined, the length of IP1 connecting the eye I and the display mounting position 110a are determined unequivocally. Further, since the length of P1P2 is also a value inherent in the display device, P1 is an intersection of an arc having a radius of IP1 with I being the center and an arc having a radius of P1P2 with P2 being the center.

Therefore, in order to move the display 100 to the optimum observation position, it is necessary only that the display 100 be tilted around the support shaft 110a and the connecting member 111 is rotated around the support shaft 110b.

In this case, however, the direction of the line of sight L1 is determined unequivocally, and cannot take an arbitrary value.

On the other hand, when the direction of the line of sight L1 is an arbitrary direction, the position of the display mounting portion 110a (P1) is determined as described below. If a straight line that is parallel with L1 and is at a distance of P1H is taken as L2, P1 lies on the straight line L2. Since the distance P1P2 takes a value inherent in the display device, P1 is an intersection of the straight line L2 and an arc having a radius of P1P2 with P2 being the center. In this case, however, the observation distance a cannot take an arbitrary value.

In order for both of the observation distance a and the direction of the line of sight L1 to be capable of taking an arbitrary value, the length of the connecting member 111 must be changed.

Specifically, P1 that meets a requirement that both of the observation distance a and the direction of the line of sight L1 be arbitrary is an intersection of an arc having a radius of IP1 with I being the center and the straight line L2 since the requirement is met when P1 lies on the straight line L2 and IH is equal to the observation distance a, P1. Therefore, it is necessary that the length of P1P2 do not take a constant value and be variable.

As described above, when the length of the connecting member 111 is fixed, the display 100 cannot meet the requirement that both of the observation distance a and the direction of the line of sight L1 be arbitrary. However, since the ordinary observation range has some degree of allowable range, the display 100 can be brought to the optimum observation position in the allowable range.

However, in order to move the display 100 to the optimum observation position by using the position adjusting mechanism shown in FIG. 20, it is necessary to rotate the connecting member 111 around the support shaft 110b while the display 100 is held by a hand and is tilted around the support shaft 110a. When this adjusting operation is performed, the display 100 can be tilted around the support shaft 110a by a rotational force only, but the support shaft 110b is subjected to a force in the direction indicated by the arrow A or B shown in FIG. 20 by a frictional force caused by friction. Specifically, a force in a direction such as to move the mounting mechanism vertically acts.

Generally, the mounting mechanism of this type has only a holding force of a degree necessary to hold the weight of device to reduce the burden on a wearer. Therefore, when the above-described force acts, the mounting mechanism itself moves undesirably, so that when the position of the display 100 is adjusted, the movement must be prevented, for example, by holding the mounting mechanism by a hand.

Japanese Utility Model Registration No. 3053061 has disclosed a position adjusting mechanism in which the friction of shafts corresponding to the support shafts 110a and 110b is adjusted with screws. Specifically, by loosening the screws, the shafts corresponding to the support shafts 110a and 110b are made capable of rotating freely with respect to the connecting member, and by tightening the screws, the shafts are finally fixed.

According to such a position adjusting mechanism, since the display and the connecting member are rotatable freely in the state in which the screws are loosened, a force is not applied to the mounting mechanism at the time of adjusting operation. When the display is fixed at the optimum position, however, an operation must be: performed in which screws provided on two shafts are tightened while the display and the connecting member are held by a hand in the freely rotatable state. Also, when the screws are loosened, the loosening operation must be performed while the display is held by a hand. Therefore, there arises a problem in that the operation is troublesome.

Also, in the above-described prior art, when the observer raises the display in an attempt to directly see the outside in the state in which the position has been adjusted, the friction of the support shaft cannot be released in the configuration of Japanese Patent Laid-Open No. 9-280247, so that the mounting mechanism may come off unless the mounting portion is held by a hand. Also, in the configuration of Japanese Utility Model Registration No. 3053061, the screws must be loosened, which poses a problem in that the operation for raising the display cannot be performed in a hurry.

SUMMARY OF THE INVENTION

The present invention has been made to solve the above problems with the prior art, and accordingly an object thereof is to provide a position adjusting mechanism attached between equipment the position of which is to be adjusted and a support portion the position of which is fixed, characterized in that an unnecessary force is not transmitted to the support portion when the position of the equipment is adjusted, and the adjustment of position can be made easily and surely.

Also, another object of the present invention is to provide a position adjusting mechanism attached between display equipment the position of which is to be adjusted and a support portion the position of which is fixed, characterized in that the position of the display equipment can be adjusted while a requirement that both of an observation distance and an observation direction be arbitrary at the same time is met.

Still another object of the present invention is to provide a position adjusting mechanism attached between display equipment the position of which is to be adjusted and a support portion the position of which is fixed, characterized in that the display equipment can be moved easily from the field of vision of an observer.

The gist of the present invention consists in a position adjusting mechanism which connects equipment the position of which is to be adjusted to support means for supporting the equipment so as to be movable relatively, comprising first movable means connected with the support means; second movable means connected with the equipment; first locking means moving between a first position at which the first movable means is locked and a second position at which the first movable means is movable; second locking means moving between a first position at which the second movable means is locked and a second position at which the second movable means is movable; and moving means for moving the first and second locking means at the same time, the moving means moving between a full locking position at which both of the first and second locking means move to the first position and a full unlocking position at which both of the first and second locking means move to the second position.

Also, another gist of the present invention consists in a head mount display device using the position adjusting mechanism in accordance with the present invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]
(General Configuration)

Figure 1:
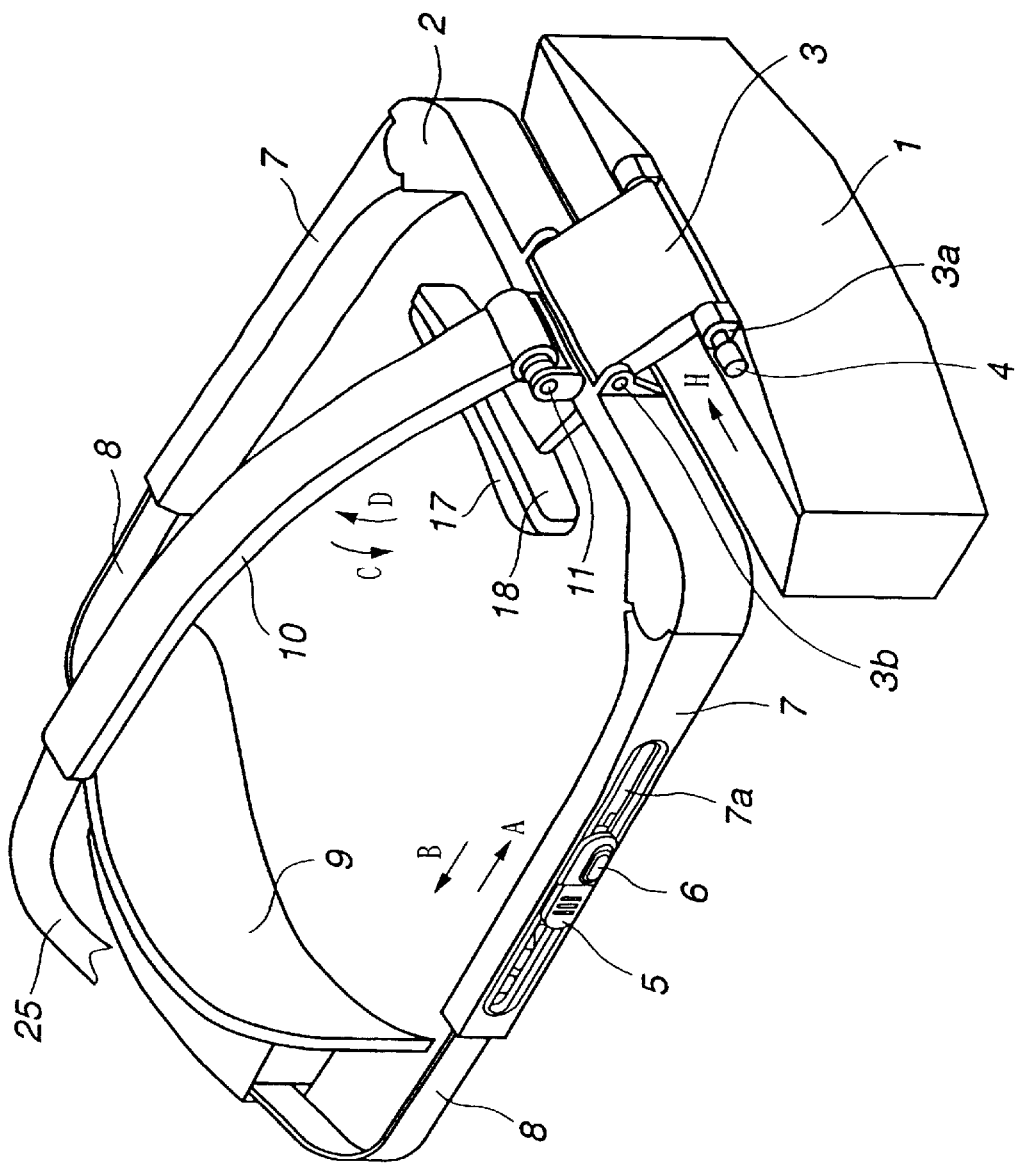
FIG. 1 is a perspective view showing a general configuration of a head mount display device to which a position adjusting mechanism in accordance with a first embodiment of the present invention is applied.

FIG. 1 is a perspective view showing a general configuration of a head mount display device which is shown as one example of the device to which a position adjusting mechanism in accordance with a first embodiment of the present invention is applied.

In FIG. 1, Reference numeral 1 denotes a display portion such as LCD, which is equipment the position of which is adjusted by the position adjusting mechanism in accordance with the present invention. The display portion 1 displays an image supplied through a cable 25, described later, and presents it to a wearer. The display portion 1 is attached to a front frame 2 of a head mount mechanism via a connecting member 3 serving as the position adjusting mechanism in accordance with this embodiment. In this embodiment, the connecting member 3 has shafts 3a and 3b, and connected to a display portion 1 via the shaft 3a and to the front frame 2 via the shaft 3b. The shafts 3a and 3b are configured so as to be rotated freely without load in a state in which an unlock button 4 is pressed in the direction indicated by the arrow H and to be locked at its position when the unlock button 4 is released. Therefore, the wearer can change the position of the display portion 1 easily without moving the head mount mechanism after the head mount display device is mounted.

On the inside of the front frame 2, a sponge-like pad 17 for pressing the front head of the wearer is attached via a pad mount 18. Further, on both sides, right and left, of the front frame 2, two side frames 7 opposed to the side heads of the wearer when the device is mounted are attached so as to be rotatable in the horizontal direction in a range of a predetermined angle. Also, reference numeral 8 denotes a band having flexibility, and in the center thereof is provided a rear pad 9 for pressing the rear head of the wearer.

Also, at each end of the band 8 is integrally provided a knob 5 that is slidable along a groove 7a formed in the side frame 7. A release button 6 engages detachably with the knob 5, and restricts the movement of the band 8 in the direction indicated by the arrow B (the direction of loosening the pressing of head by using the head mount mechanism). The configuration and operation of the release button 6 and the groove 7a will be described later in detail.

Reference numeral 10 denotes a top frame attached to a front frame 2 via a shaft 11. The top frame 10 is configured so as to be rotated downward (in the direction indicated by the arrow C) around the shaft 11 by its weight etc. substantially with no load or with a low load, and to be rotated upward (in the direction indicated by the arrow D) around the shaft 11 when a force higher than a given load determined by a friction member is applied. The mounting construction of the top frame 10 will also be described later in detail.

Reference numeral 25 denotes a signal cable for connecting the display portion 1 to a controller (not shown) for carrying out display control. In this embodiment, the signal cable 25 is laid out so as to pass through the inside of the top frame 10 from the rear head end of the top frame 10 and to be connected to the display portion 1.

(Construction of Side Frame 7)

Next, the mounting construction of the side frame 7 and the front frame 2 will be described with reference to FIGS. 2 and 3.

Figure 2:
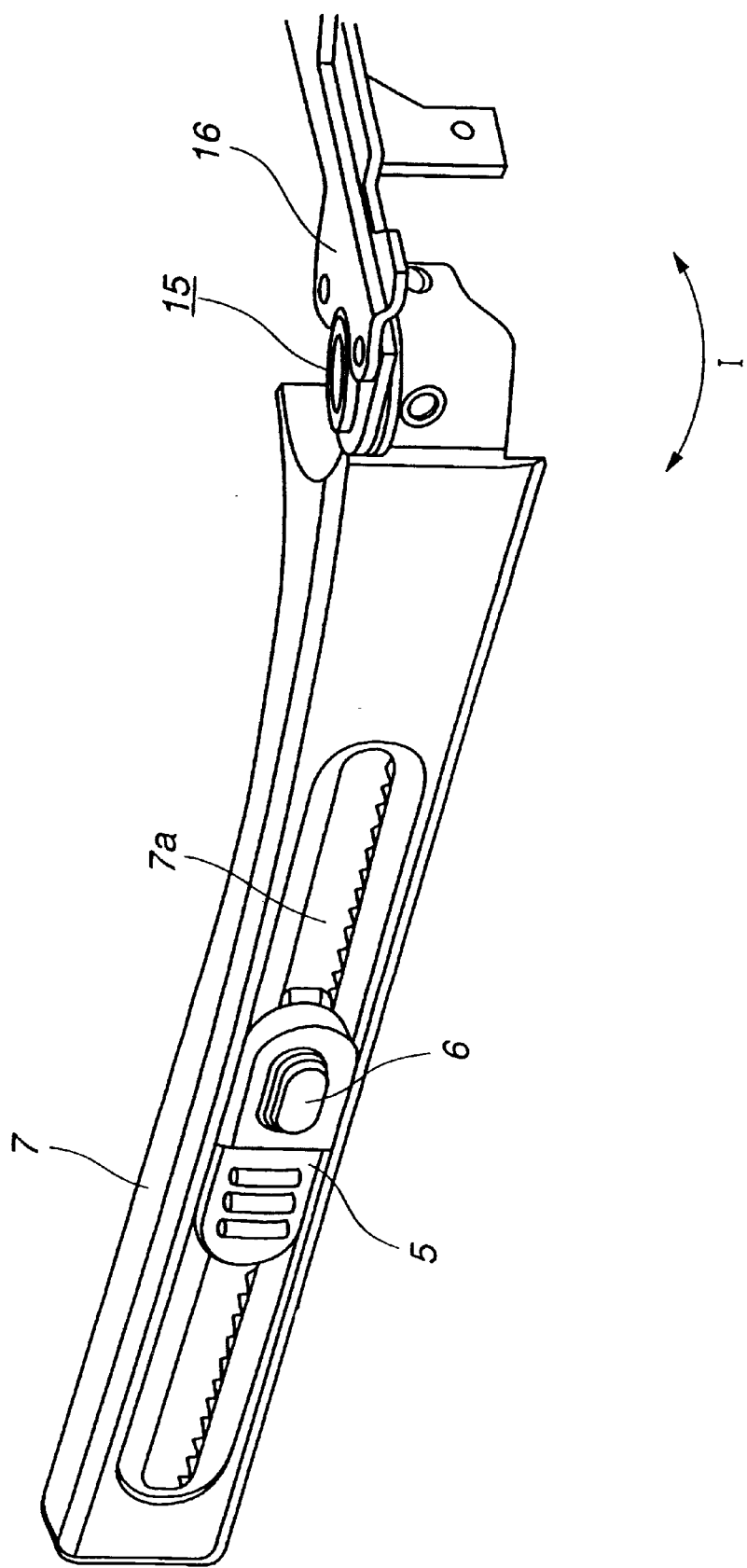
FIG. 2 is an explanatory view of an mounting construction of a side frame 7 shown in FIG. 1.

As shown in FIG. 2, the side frame 7 is attached to a stay 16, which is a structure provided integrally in the front frame 2, via a friction 15 so as to be rotatable in the horizontal direction in a range of a predetermined angle in the direction indicated by the arrow I.

Figure 3:
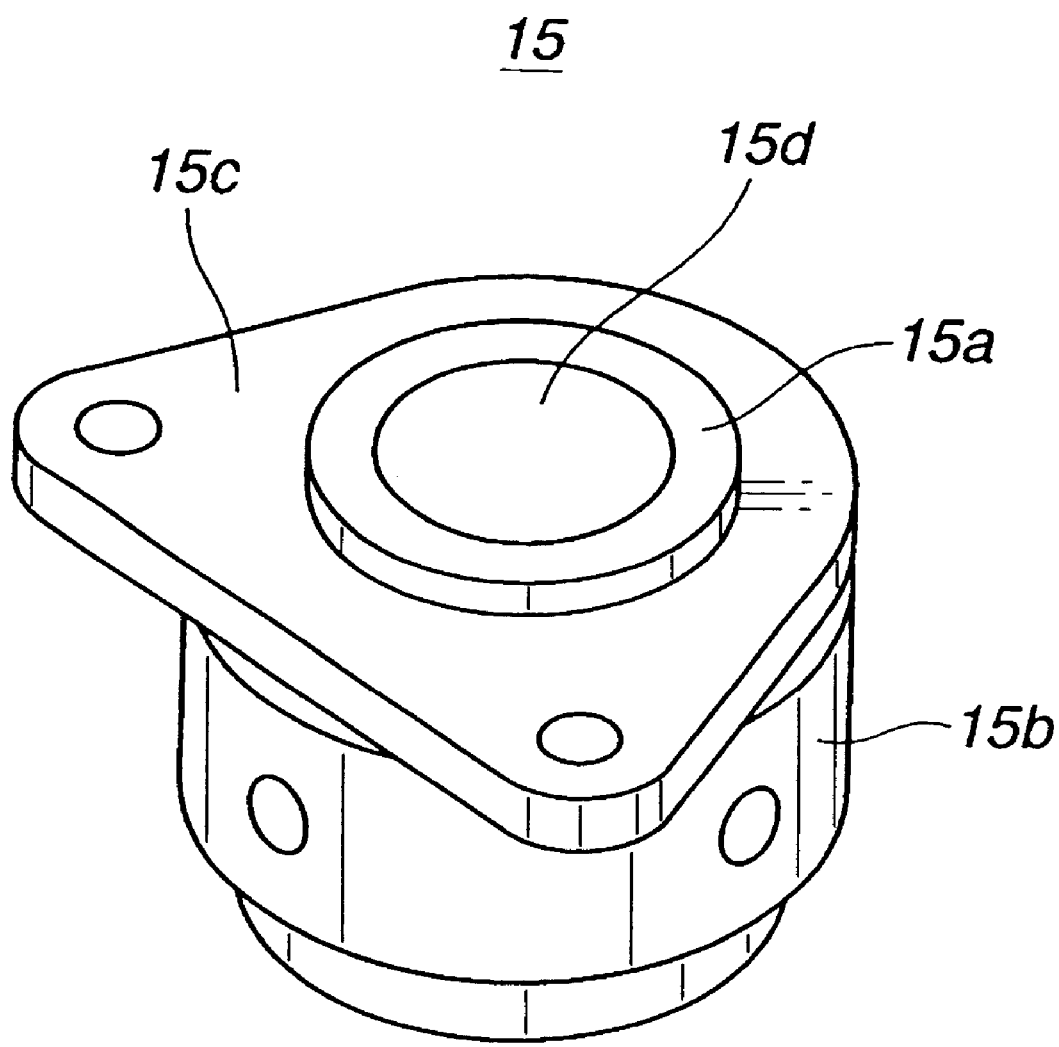
FIG. 3 is a perspective view of a friction 15 shown in FIG. 2.

FIG. 3 is a perspective view of the friction 15. The friction 15, which is made up of an inner ring 15a having an attachment portion 15c and an outer ring 15b, is configured so as to have a fixed frictional force between the inner ring 15a and the outer ring 15b. The inner ring 15a is attached to the stay 16 provided integrally with the front frame 2 via the attachment portion 15c, and the outer ring 15b is fixed to the side frame 7. Therefore, the side frame 7 rotates with a fixed frictional force with respect to the front frame 2 with the friction 15 being a hinge. Although FIG. 2 shows only the mounting construction at the left end of the front frame 2, at the right end is also attached the side frame 7 by using the same construction.

(Mounting Construction of Band 8)

Next, the mounting construction of the band 8 and the side frame 7 will be described with reference to FIGS. 4 to 6.

Figure 4:
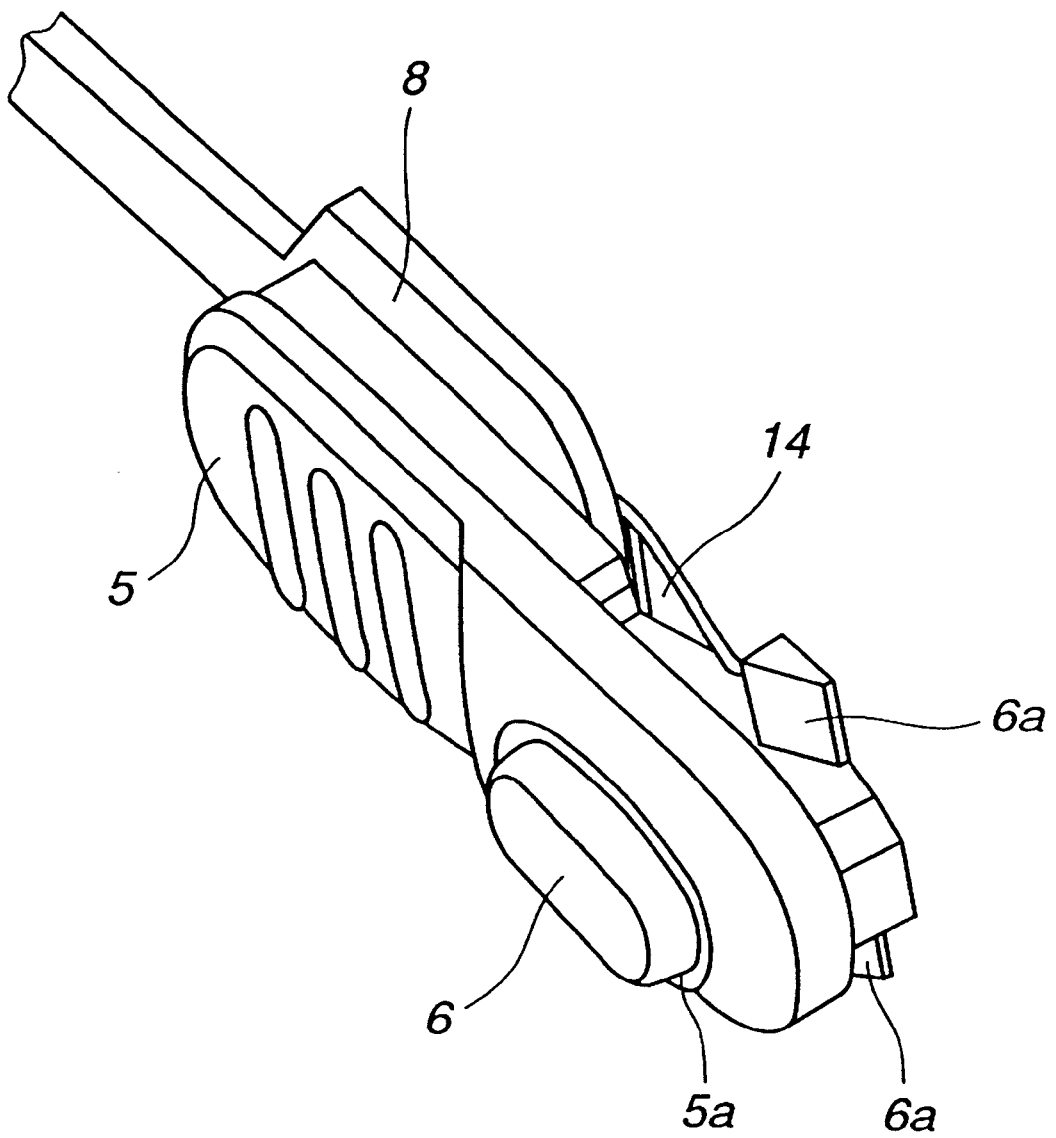
FIG. 4 is a perspective view showing a positional relationship between a knob 5 and a release button 6 provided on a band 8.
Figure 5:
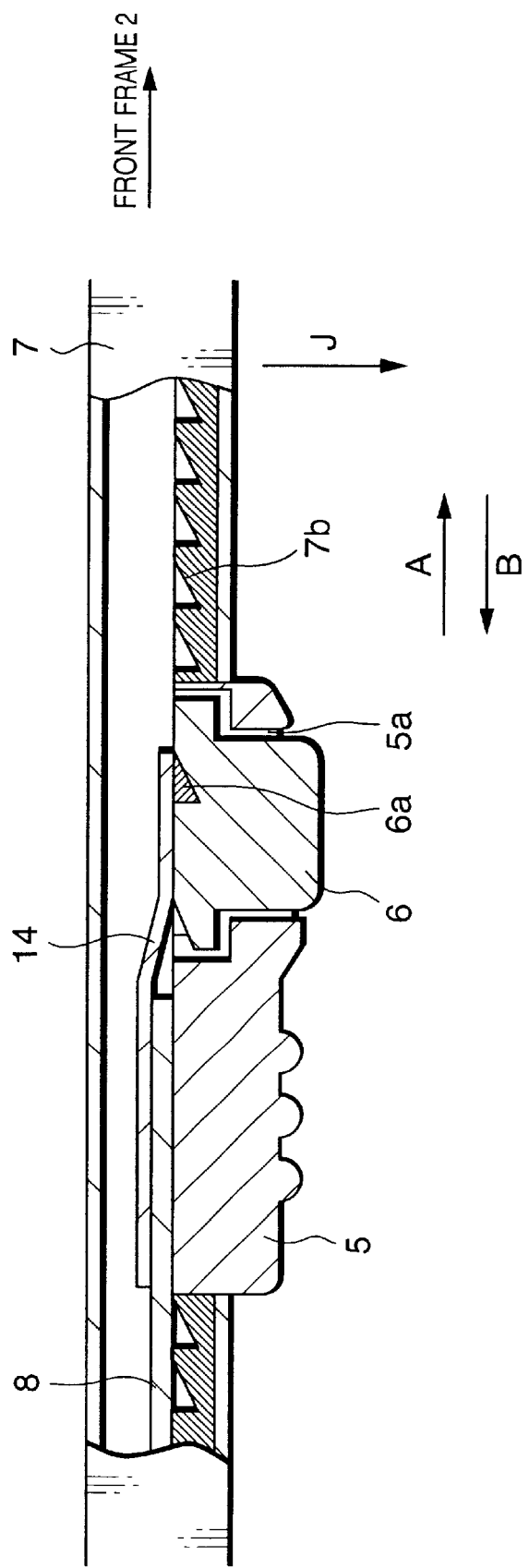
FIG. 5 is a horizontal sectional view for illustrating a configuration in which the movement of a knob 5 is restricted by a release button 6.
Figure 6:
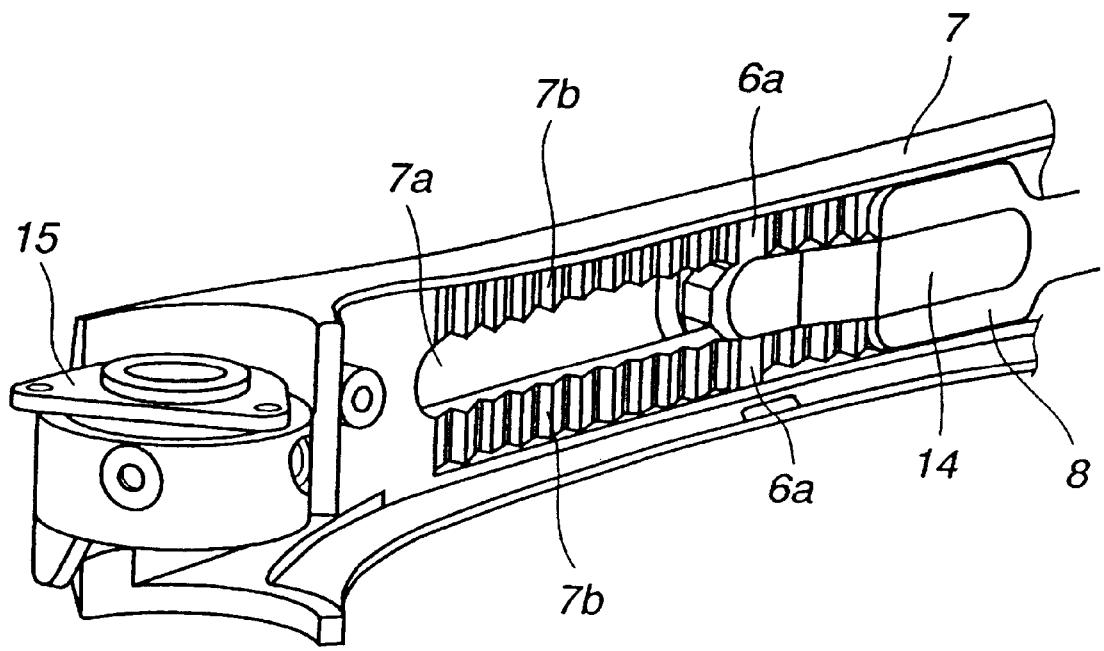
FIG. 6 is a perspective view in which the connecting portion of a side frame 7 and a band 8 is viewed from the inside.

FIG. 4 is a perspective view showing a positional relationship between the knob 5 and the release button 6 provided at each end of the band 8, FIG. 5 is a horizontal sectional view for illustrating a configuration in which the movement of the knob 5 is restricted by the release button 6, and FIG. 6 is a perspective view in which the connecting portion of the side frame 7 and the band 8 is viewed from the inside of the side frame 7.

The knob 5 is formed with a hole 5a as shown in FIGS. 4 and 5, and the release button 6 is fitted in this hole 5a. The release button 6 is urged in the direction indicated by the arrow J by a plate spring 14 provided integrally with the knob 5.

Also, at the sides of the release button 6 are provided a pair of claws 6a as shown in FIGS. 4 and 6. The claw 6a has a shape such that the claw 6a engages with sawtooth-shaped protrusions 7b provided on the inside surface at each side of the groove 7a in the side frame 7 as shown in FIG. 6, and the sawtooth-shaped protrusions 7b, the claw 6a, and the plate spring 14 form a ratchet mechanism. Therefore, in FIG. 5, the knob 5 moves freely in the direction indicated by the arrow A, which is the direction in which the length of the band 8 is shortened or the direction in which a distance between the front pad 17 and the rear pad 9 is decreased to press the head of the wearer, and the movement of the knob 5 in the opposite direction indicated by the arrow B is inhibited by the claw 6a being caught by the sawtooth-shaped protrusion 7b. When the knob 5 is moved in the direction indicated by the arrow B, the release button 6 is pressed to release the claw 6a from the sawtooth-shaped protrusion 7b.

(Mounting Construction of Top Frame 10)

Figure 7:
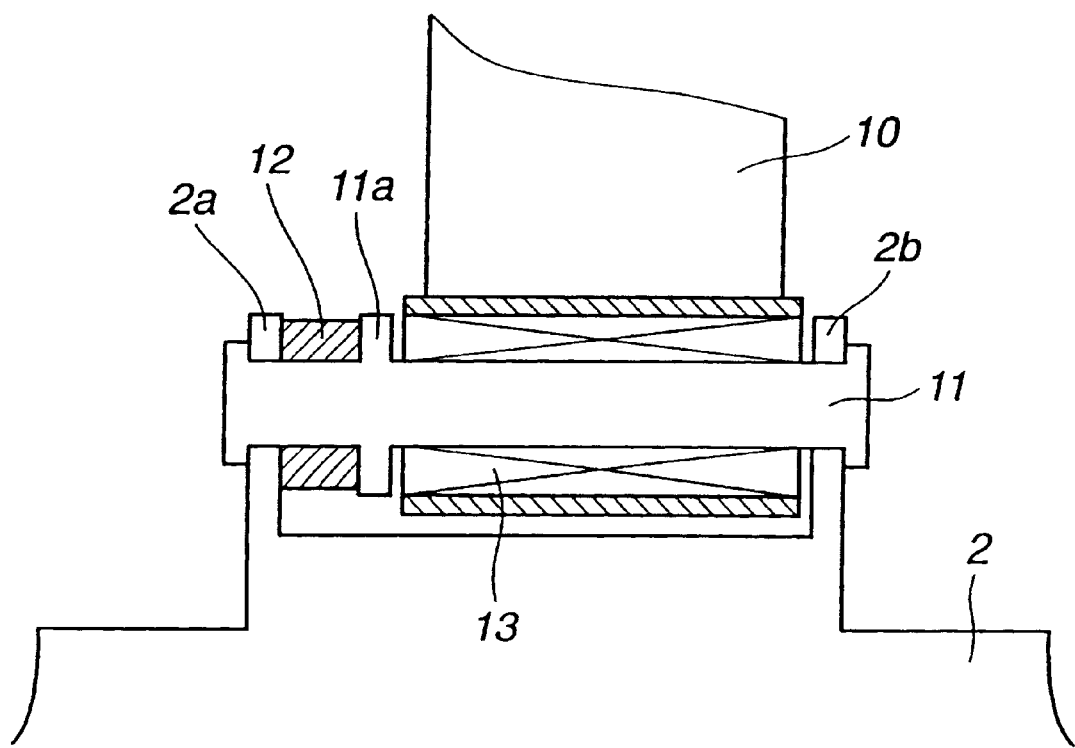
FIG. 7 is a vertical sectional view for illustrating an mounting construction of a top frame 10.

FIG. 7 is a vertical sectional view showing an mounting construction of the top frame 10. In FIG. 7, the hatching of the shaft 11 and the front frame 2 is omitted for clarity.

In FIG. 7, the shaft 11 is attached rotatably on support portions 2a and 2b provided on the front frame 2. Also, the shaft 11 has a collar 11a near the support portion 2a, and a friction member 12 is provided between the collar 11a and the inside wall of the support portion 2a so as to surround the shaft 11. A frictional force produced between the inside wall of the collar 11a and the friction member 12 gives a load mainly to the rotation of the shaft 11.

On the other hand, a one-way clutch 13 is attached between the collar 11a of the shaft 11 and the support portion 2b. To the one-way clutch 13 is attached one end of the top frame 10. The one-way clutch 13 rotates easily in the direction indicated by the arrow C in FIG. 1. Therefore, the top frame 10 can rotate easily in the direction indicated by the arrow C in FIG. 1 with respect to the shaft 11, for example, by the weight of the top frame 10 or by a low load, but does not rotate in the direction indicated by the arrow D in FIG. 1 until a load higher than the frictional force of the friction member 12 is applied.

Figure 8:
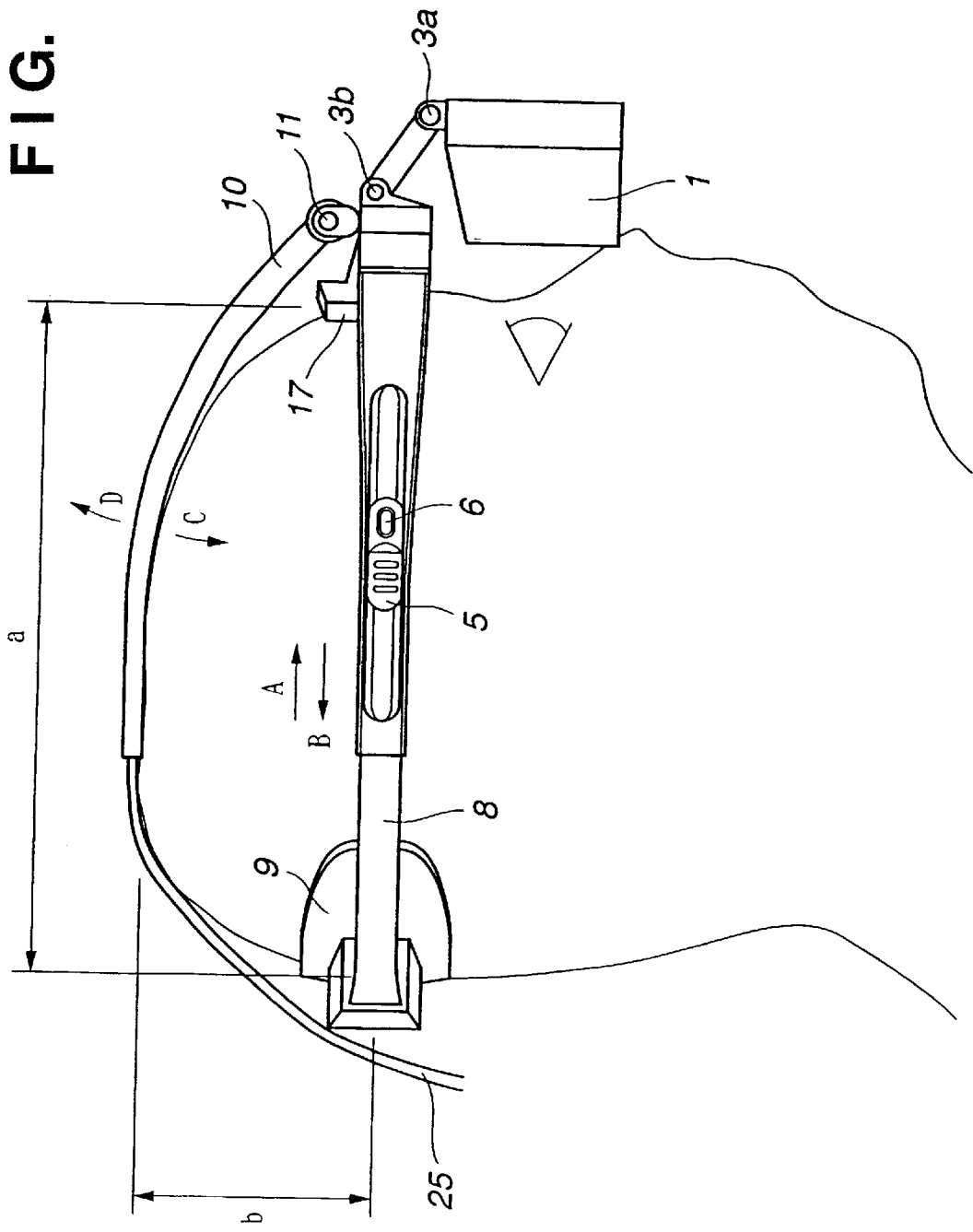
FIG. 8 is a view showing a state in which the head mount display device shown in FIG. 1 is mounted.

In this embodiment, the top frame 10 is positioned by a member such as a stopper (not shown) in a state in which a portion in contact with a top head portion of the top frame 10 is lowered most by its weight etc. in an unmounted state. This position is a position at which the top frame 10 lowers more than the minimum value of the distance b of the head mount display device shown in FIG. 8.

(Construction of Position Adjusting Mechanism)

Next, the construction and operation of the connecting member 3, which is the position adjusting mechanism in this embodiment, will be described in detail with reference to FIGS. 9 to 12.

Figure 9:
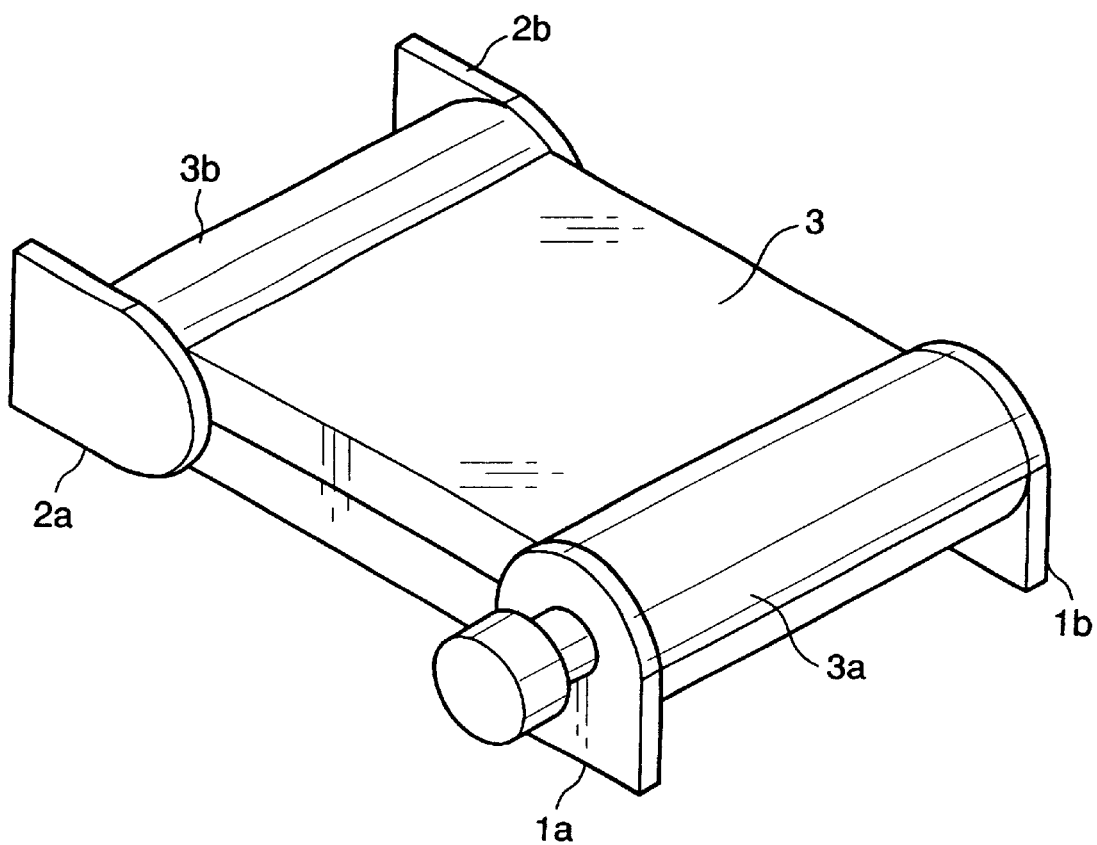
FIG. 9 is a perspective view of a connecting member in the first embodiment.
Figure 10:
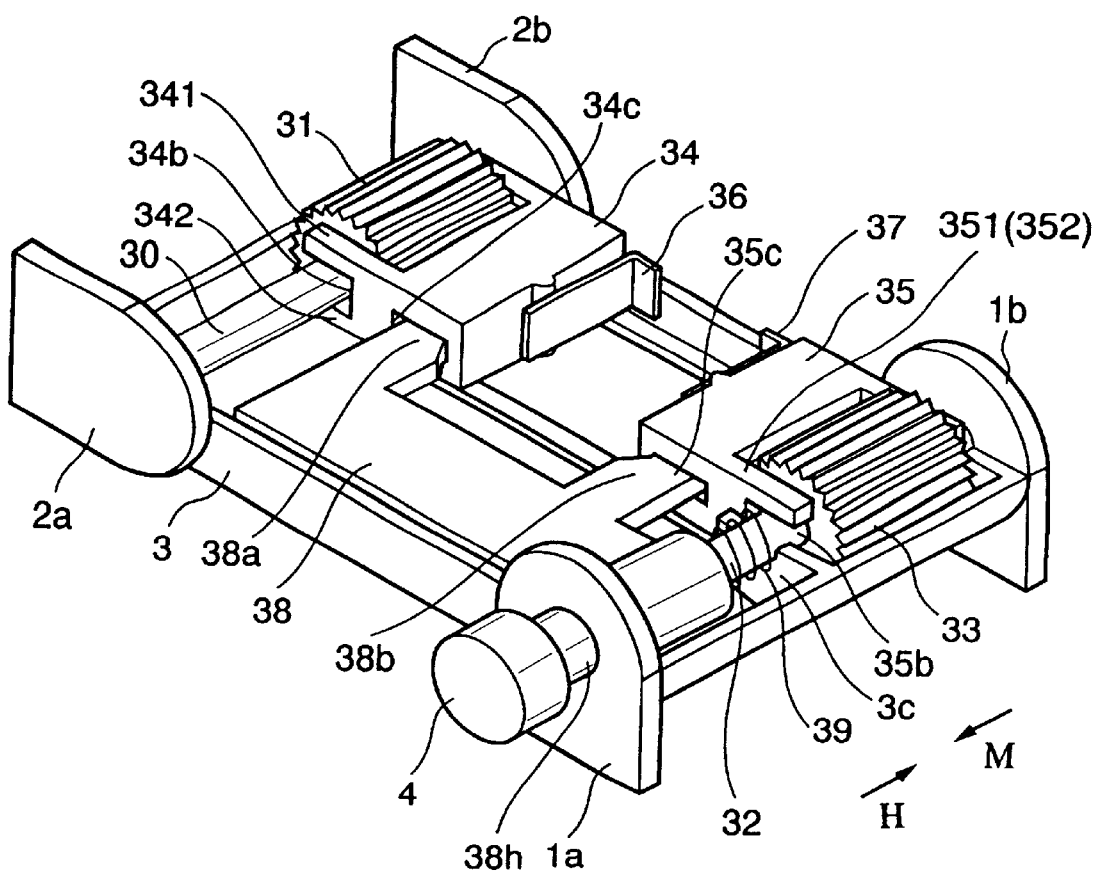
FIG. 10 is a perspective view showing a state in which a top cover of a connecting member in the first embodiment is removed.
Figure 11:
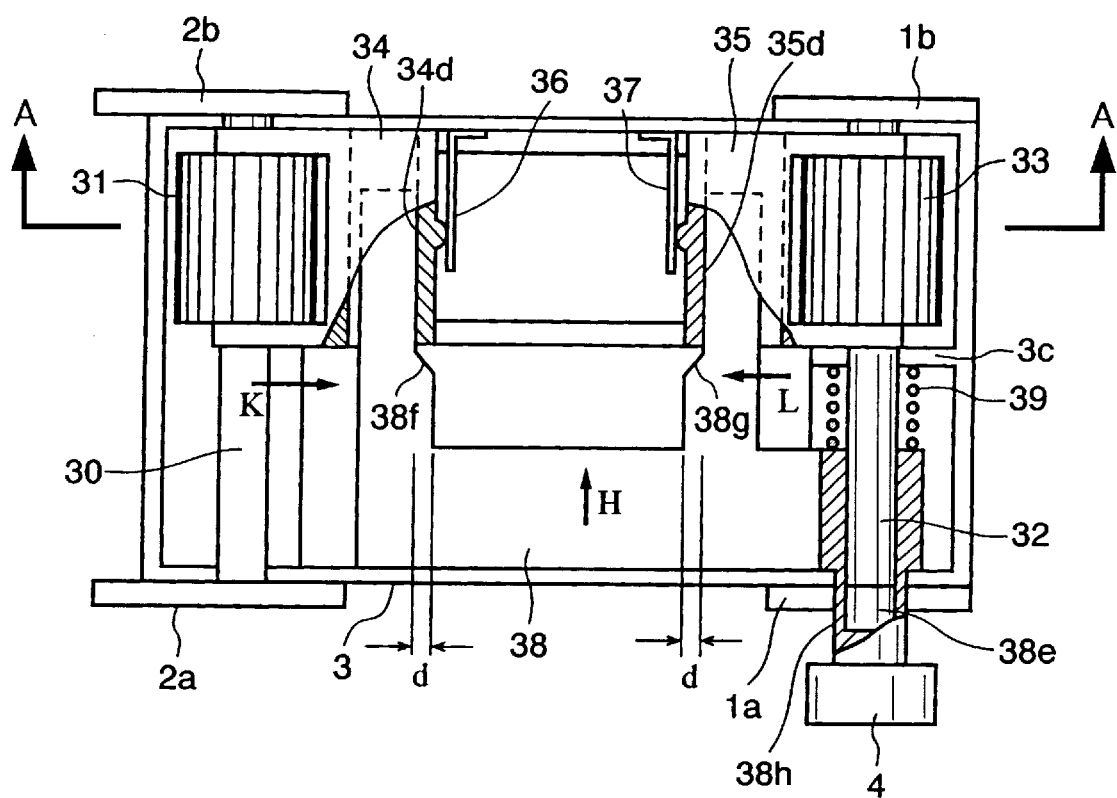
FIG. 11 is a plan view of FIG. 10.
Figure 12:
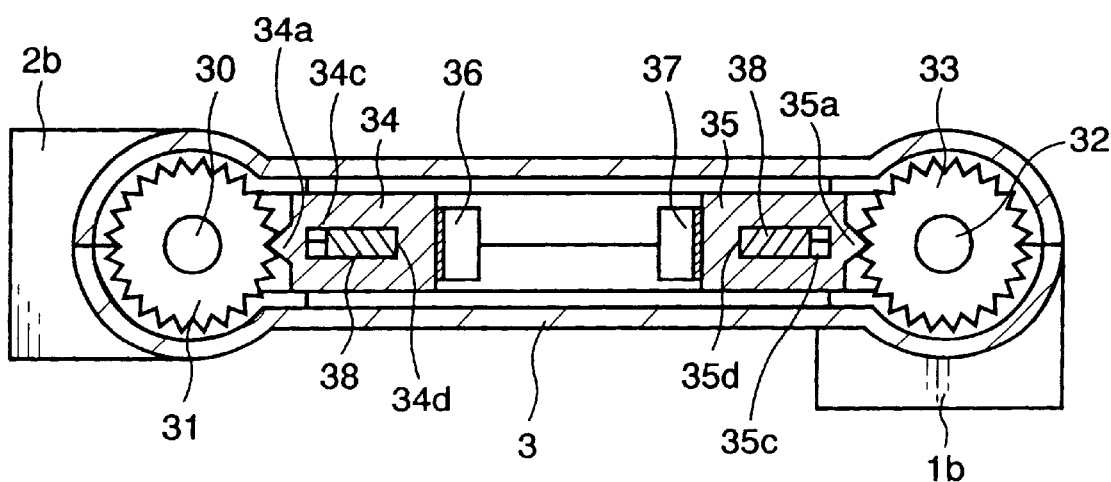
FIG. 12 is a sectional view taken along the line A—A of FIG. 11.

FIG. 9 is a perspective view of the connecting member 3, FIG. 10 is a perspective view showing a state in which a top cover of the connecting member 3 is removed, FIG. 11 is a plan view of FIG. 10, and FIG. 12 is a sectional view taken along the line A—A of FIG. 11.

As shown in FIG. 9, the connecting member 3 in this embodiment is attached rotatably to support portions 1a and 1b provided integrally with the display portion 1 and support portions 2a and 2b provided integrally with the front frame 2 in portions 3a and 3b thereof, respectively.

In FIG. 10, reference numeral 30 denotes a shaft fixed to the support portions 2a and 2b provided on the front frame 2. The shaft 30 is integrally provided with a gear 31 having chevron-shaped teeth at the outer periphery thereof. The shaft 30 and a shaft 32, described later, may be molded integrally with the support portions 2a, 2b and 1b, respectively.

Reference numeral 34 denotes a lock member. The lock member 34 is provided with a chevron-shaped protrusion 34a (see FIG. 12) at a position opposed to the gear 31. The lock member 34 is configured so that when the lock member 34 is at a lock position, the chevron-shaped protrusion 34a engages with a valley of the chevron-shaped teeth provided at the outer periphery of the gear 31. The lock member 34 has notches 34b at the right and left end thereof, and has tip end portions 341 and 342 over and under the notch 34b, the tip end portion extending to the both end faces of the gear 31 and reaching the upside and downside of the shaft 30. Also, the lock member 34 is provided with a square hole 34c on the inside end face thereof. In this square hole 34c, one part 38a of an unlock lever 38 is inserted. Also, the lock member 34 is configured so as to be movable in the direction such as to come close to and go away from the gear 31 along the tip end portions 341 and 342 and the bottom surface, and is urged toward the gear 31 by a plate spring 36.

Reference numeral 32 denotes a shaft fixed to the support member 1b provided on the display portion 1. The tip end portion or a portion on the side of the support member 1a of this shaft 32 is fitted in a hole 38e (see FIG. 11) formed in the unlock lever 38. Reference numeral 33 denotes a gear provided with chevron-shaped teeth at the outer periphery thereof, like the gear 31, which is attached integrally with the shaft 32.

Along both end faces of the gear 33, a lock member 35 having the same shape as that of the above-described lock member 34 is attached. In the right and left end portions of the U-shaped lock member 35 is formed a notch 35b, and tip end portions 351 and 352 extending from the notch 35b reach the upside and downside of the shaft 32. Also, like the lock member 34, the lock member 35 is urged toward the gear 33 by a plate spring 37. Also, a part 38b of the unlock lever 38 is inserted in a square hole 35c formed in the lock member 35.

A shaft portion 38h of the unlock lever 38 is rotatably supported on the support portion 1a provided on the display portion 1, and the unlock button 4 is integrally attached to the tip end of the shaft portion 38h. Reference numeral 39 denotes a compression spring. The compression spring 39 is attached between a wall 3c provided on the connecting member 3 and urge the unlock lever 38 in the direction indicated by the arrow M.

(Operation of Mechanism)

The head mount display device in accordance with this embodiment, which uses the position adjusting mechanism having the above-described configuration, is mounted on the head of the wearer as described below. First, the head is inserted in a space surrounded by the front frame 2, the two side frames 7, and the band 8 so that the head is covered with the head mount display device. The top frame 10 is pushed up against the frictional force of the friction member 12 from a position at which the tip end of the top frame 10 hits the head top, by which the distance b between the head top and the side frame 7 is adjusted. At the same time, both of the side frames 7 are rotated toward the inside against the friction of the friction 15 until the side frames 7 lightly hit the side head. Then, the knobs 5 are moved in the direction indicated by the arrow A to hold the front head and the rear head between the front pad 17 and the rear pad 9 as shown in FIG. 9, and thereafter the knobs 5 are released at a position at which the distance a in FIG. 8 has been adjusted to prevent the head mount display device from being unsteady.

By the above-described operation, the whole of the head mount display device including the display portion is supported on the front head, rear head, top head, and side heads, and is fixed to the head of the wearer.

Next, the position of the display portion 1 is adjusted. First, the unlock button 4 provided on the position adjusting mechanism 3 is pressed, by which the unlock lever 38 is moved in the direction indicated by the arrow H (see FIG. 10) together with the shaft portion 38h. The parts 38a and 38b of the unlock member 38 inserted in the square holes 34c and 35c in the lock members 34 and 35 are provide with tapers 38f and 38g (FIG. 11), respectively. In a state in which the unlock button 4 is not pressed, that is, in a locked state, a portion narrower than the taper is inserted in the lock member.

Figure 13:
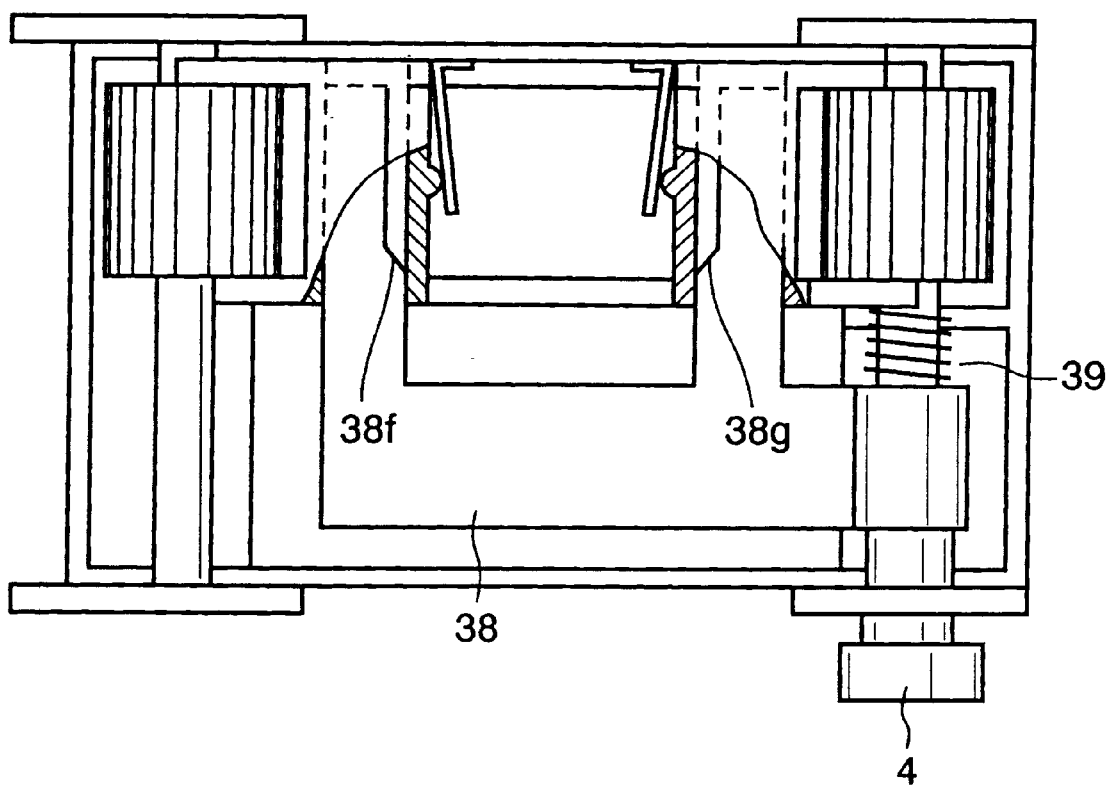
FIG. 13 is a plan view showing an operation of a mechanism in the first embodiment.

On the other hand, when the unlock button 4 is pressed, the unlock lever 38 moves in the direction indicated by the arrow H (FIG. 11). Therefore, the tapers 38f and 38g provided on the parts 38a and 38b intrude into the square holes 34c and 35c in the lock members 34 and 35 against the urging force of the plate springs 36 and 37, by which the parts 38a and 38b are moved through the distance d in the directions indicated by the arrows K and L, respectively (FIG. 13).

Therefore, the distance d is determined so that in the state in which the unlock button 4 is depressed, the protrusions 34a and 35a separate from the teeth of the opposed gears 31 and 32, respectively, and the lock members 34 and 35 move through a distance necessary to unlock the gears 31 and 32. Thereby, the depression of the unlock button 4 unlocks both of the shafts 30 and 32. Thereupon, the connecting member 3 can be rotated freely in a state in which a load is scarcely applied to the support portions 1a and 1b on the side of the display portion 1 and the support portions 2a and 2b on the side of the frame 2. In this state, the display portion 1 is moved to an arbitrary optimum observation position.

When the display portion 1 reaches the optimum observation position, the unlock button 4 is released. Thereby, the lock members 34 and 35 are pushed back by the urging forces of the plate springs 36 and 37, so that the unlock lever 38 is pushed back in the direction indicated by the arrow M (see FIG. 10).

Thereby, the parts 38a and 38b of the unlock lever 38 are returned to the original positions, so that the lock members 34 and 35 are moved toward the shafts 30 and 32 by the urging forces of the plate springs 36 and 37. As a result, the protrusions 34a and 35a of the lock members 34 and 35 engage with the gears 31 and 33, respectively. That is to say, the connecting member 3 is locked with respect to the support portions 1a and 1b on the side of the display portion 1 and the support portions 2a and 2b on the side of the frame 2. Further, the compression spring 39 ensures to return back the unlock button 4 to the original position.

Thereby, the display portion 1 is fixed to an arbitrary optimum observation position.

As described above, according to the position adjusting mechanism in accordance with this embodiment, both of the adjustment of angle and the adjustment of vertical position of the display portion 1 can be made only by the operation of the unlock button 4, and also the position can be fixed easily.

[Second Embodiment]

(Construction of Mechanism)

In the above-described first embodiment, since the length of the connecting member 3, which is the position adjusting mechanism, is fixed, if the observation distance is made constant for the above-described reason when the display portion 1 is moved to the optimum observation position, the observation direction is determined unequivocally and an arbitrary observation direction cannot be provided. If the observation direction is made constant, an arbitrary observation distance cannot be provided. Therefore, in the position adjusting mechanism in accordance with a second embodiment, by making the length of the connecting member 3 variable, the display portion 1 can be moved without applying an unnecessary force to the mounting portion etc., as in the case of the first embodiment, and also a requirement that both of the observation distance and the observation direction be arbitrary at the same time can be met.

Figure 14:
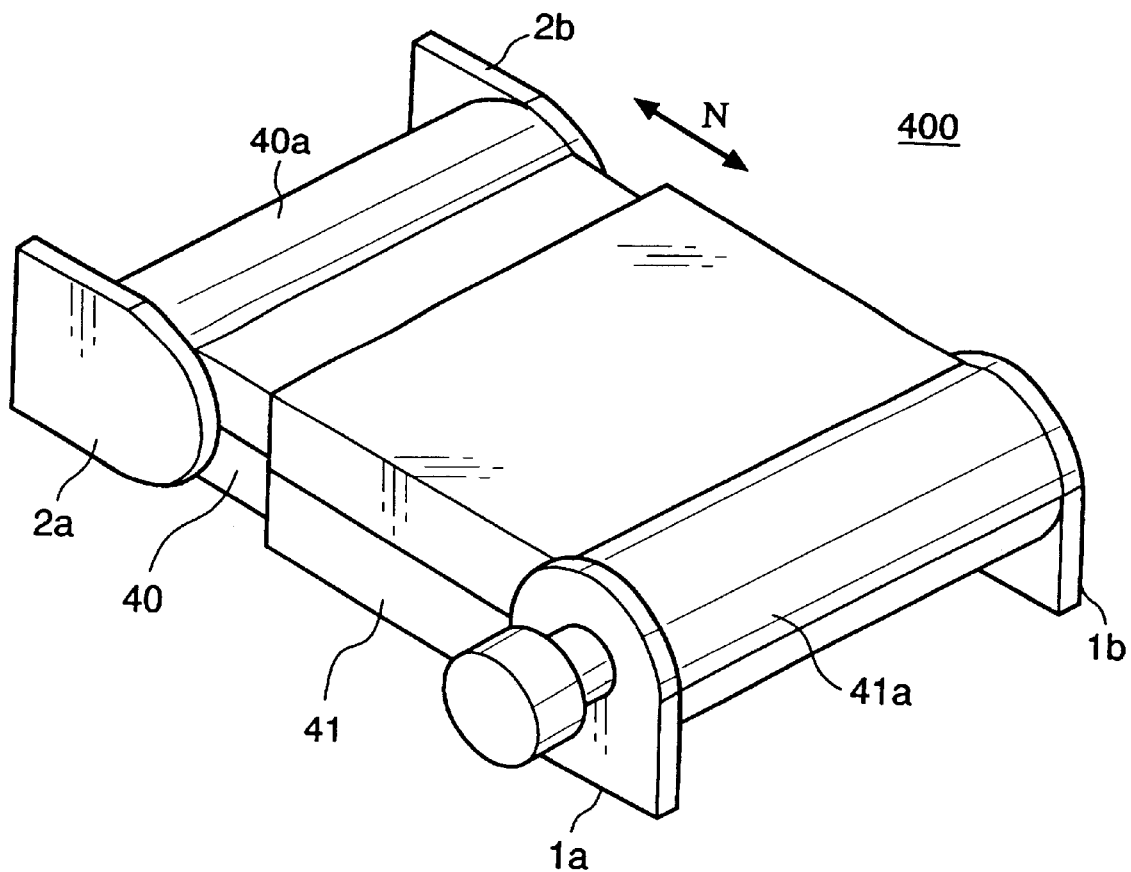
FIG. 14 is a perspective view of a connecting member in a second embodiment.
Figure 15:
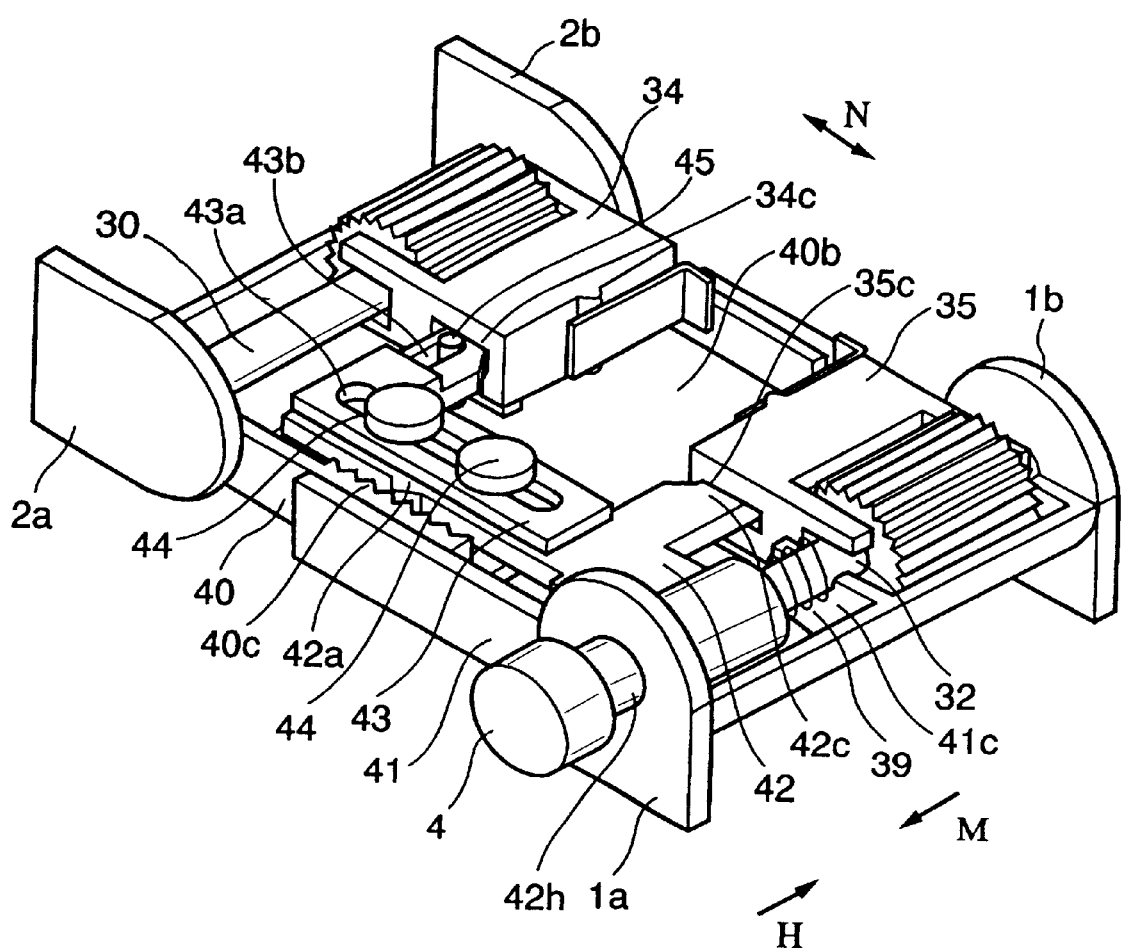
FIG. 15 is a perspective view showing a state in which a top cover of a connecting member in the second embodiment is removed.
Figure 16:
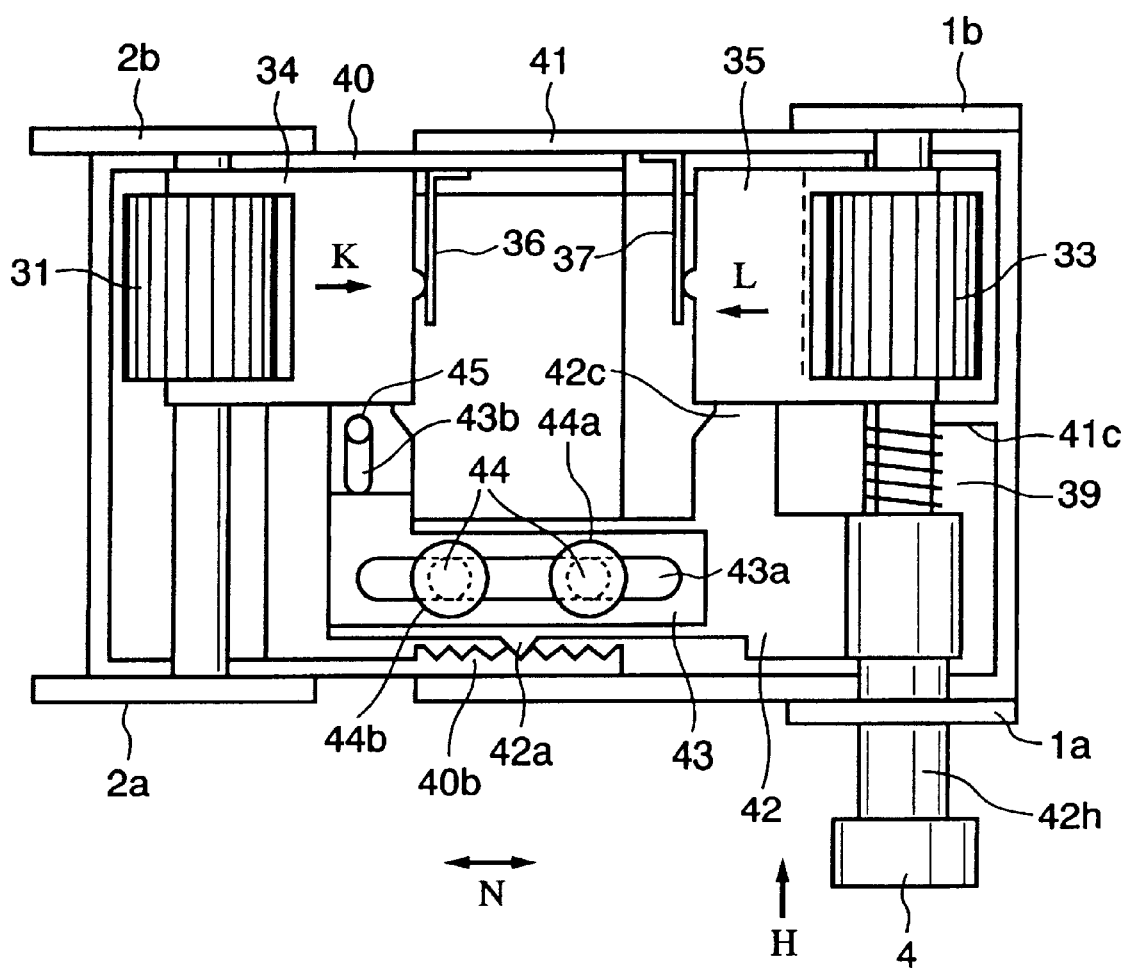
FIG. 16 is a plan view of FIG. 15.

FIGS. 14 to 16 are views showing a construction of a connecting member in accordance with the second embodiment. FIG. 14 is a perspective view showing the appearance of the connecting member in a second embodiment, FIG. 15 is a perspective view showing a state in which a top cover of the connecting member is removed, and FIG. 16 is a plan view of the state shown in FIG. 15.

As shown in FIG. 14, a connecting member 400 is made up of a member 40 and a member 41 attached so as to cover the outside of the member 40, and the member 41 is attached so as to be slidable in the direction indicated by the arrow N with the outside wall of the member 40 serving as a guide. The member 41 is attached rotatably to the support portions 1a and 1b provided integrally on the display portion 1 at 41a, and the member 40 is attached rotatably to the support portions 2a and 2b provided integrally on the frame 2 at 40a.

In FIGS. 15 and 16, reference numeral 42 denotes an unlock lever for releasing the lock on the side of the display portion 1. Like the unlock lever 38 in the first embodiment, the unlock lever 42 is attached so as to be slidable in the axial direction at the tip end portion of the shaft 32 provided integrally on the support portion 1b, and a shaft portion 42h thereof is supported rotatably on the support portion 1a provided on the display portion 1. Also, the unlock button 4 is integrally attached at the tip end of the shaft portion 42h.

The unlock lever 42 is urged in the direction indicated by the arrow M by the compression spring 39 provided between a wall 41c of the member 41 and the unlock lever 42. Further, a part 42c of the lever 42 is inserted in the square hole 35c in the lock member 35.

Also, the unlock lever 42 is provided with a chevron-shaped protrusion 42a, which engages with a plurality of chevron-shaped teeth 40c provided on the side wall of the member 40.

Reference numeral 43 denotes an unlock lever having an L shape for releasing the lock of the side of the front frame 2. The unlock lever 43 has an elongated hole 43a in a portion parallel with the direction indicated by the arrow N of the L shape, and has an elongated hole 43b in a portion of a part perpendicular to that direction. In the elongated hole 43a, there are fitted rivet-like shafts 44, 44 having a head 44a, which are integrally provided on the unlock lever 42. Also, in the elongated hole 43b, there is fitted a shaft 45 provided integrally on the bottom surface 40b of the member 40.

Therefore, the part of the unlock lever 43 can move only in the direction of the elongated hole 43b with respect to the member 40, and a portion parallel with the arrow N can slide in the direction of the elongated hole 43a with respect to the unlock lever 42.

Also, like the part 38a in the first embodiment, the tip end of the part of the unlock lever 43 is inserted in the square hole 34c in the lock member 34.

(Operation of Mechanism)

In FIGS. 15 and 16, when the unlock button 4 is pressed against the urging force of the compression spring 39 in the direction indicated by the arrow H, like the unlock lever 38 described in the first embodiment, the unlock lever 42 moves the lock member 35 in the direction indicated by the arrow L against the urging force of the plate spring 37, so that the shaft 32 on the side of the display portion 1 is unlocked.

On the other hand, when the unlock lever 42 moves in the direction indicated by the arrow H, the unlock lever 43 also moves in the direction indicated by the arrow H via the shafts 44, 44. Therefore, like the unlock lever 38 described in the first embodiment, the unlock lever 43 moves the lock member 34 in the direction indicated by the arrow K against the urging force of the plate spring 36, so that the shaft 30 on the side of the front frame 2 is unlocked.

Further, in this embodiment, by the depression of the unlock button 4, the chevron-shaped protrusion 42a provided on the unlock lever 42 also separates from the chevron-shaped teeth 40c provided on the member 40 so that the member 41 can move in the direction indicated by the arrow N with respect to the member 40. Also, since the unlock lever 42 and the unlock lever 43 can move relatively along the elongated hole 43a, the distance of the display portion 1 with respect to the front frame 2 can be changed in the state in which the lock of the shaft 32 with respect to the display portion 1 and the lock of the shaft 30 with respect to the front frame 2 are released.

Thus, in the position adjusting mechanism in accordance with this embodiment, in addition to the effect achieved by the first embodiment, by making the length variable, adjustment can be made so that the head mount display device is located at the optimum position at which both of the direction of the line of sight and observation distance are arbitrary.

[Third Embodiment]

Although the configuration is such that the lock of the shafts 30 and 32 is released at the same time by the depression of the unlock button 4 in the above-described first and second embodiments, a third embodiment is characterized in that the timing of unlocking is shifted for each shaft. In the following description, a configuration in which the unlocking of the shaft 30 is delayed as compared with the unlocking of the shaft 32 will be explained. However, as described later, reverse timing is made possible by changing the taper position of the unlock lever.

Figure 17:
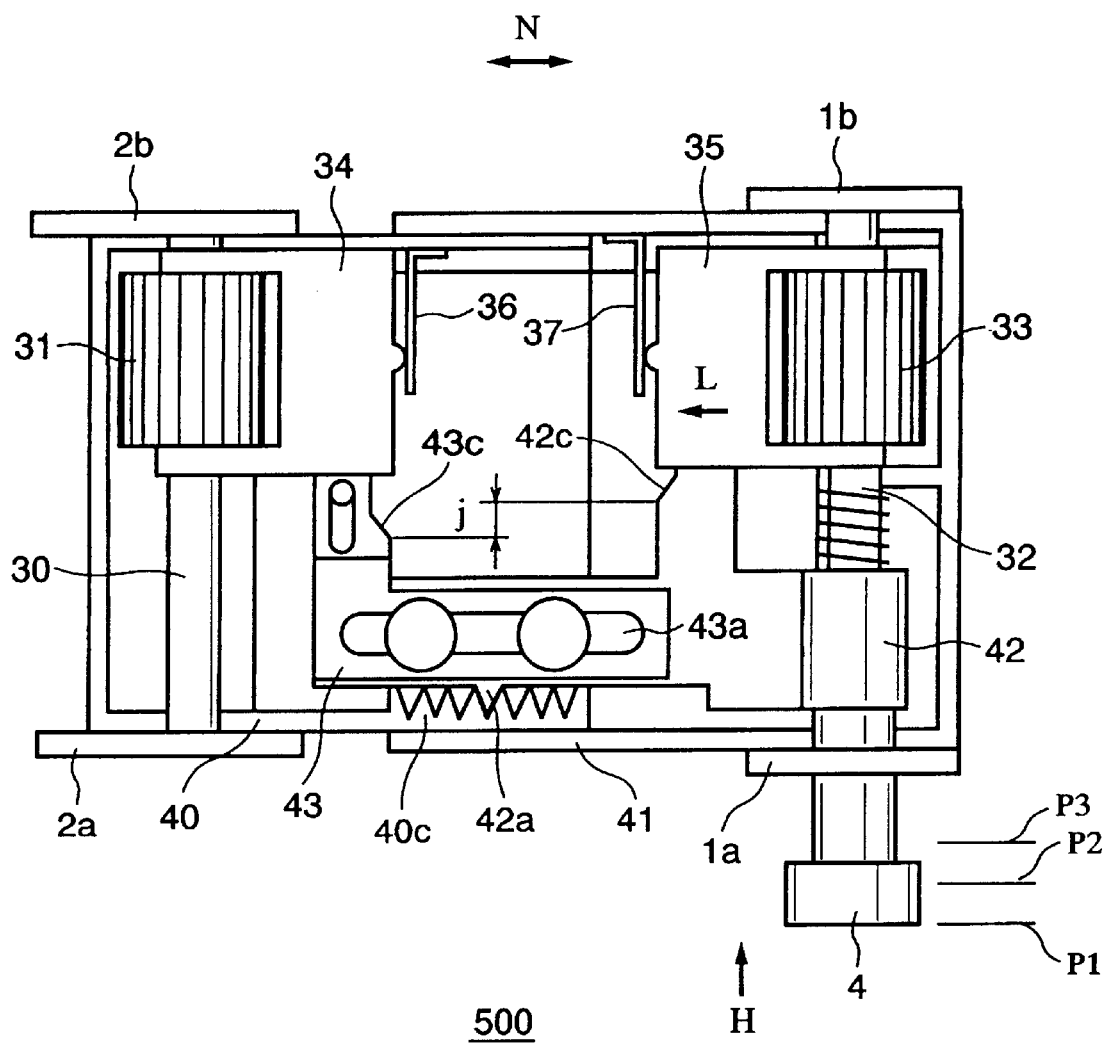
FIG. 17 is a plan view showing a construction of a connecting member in a third embodiment.
Figure 18:
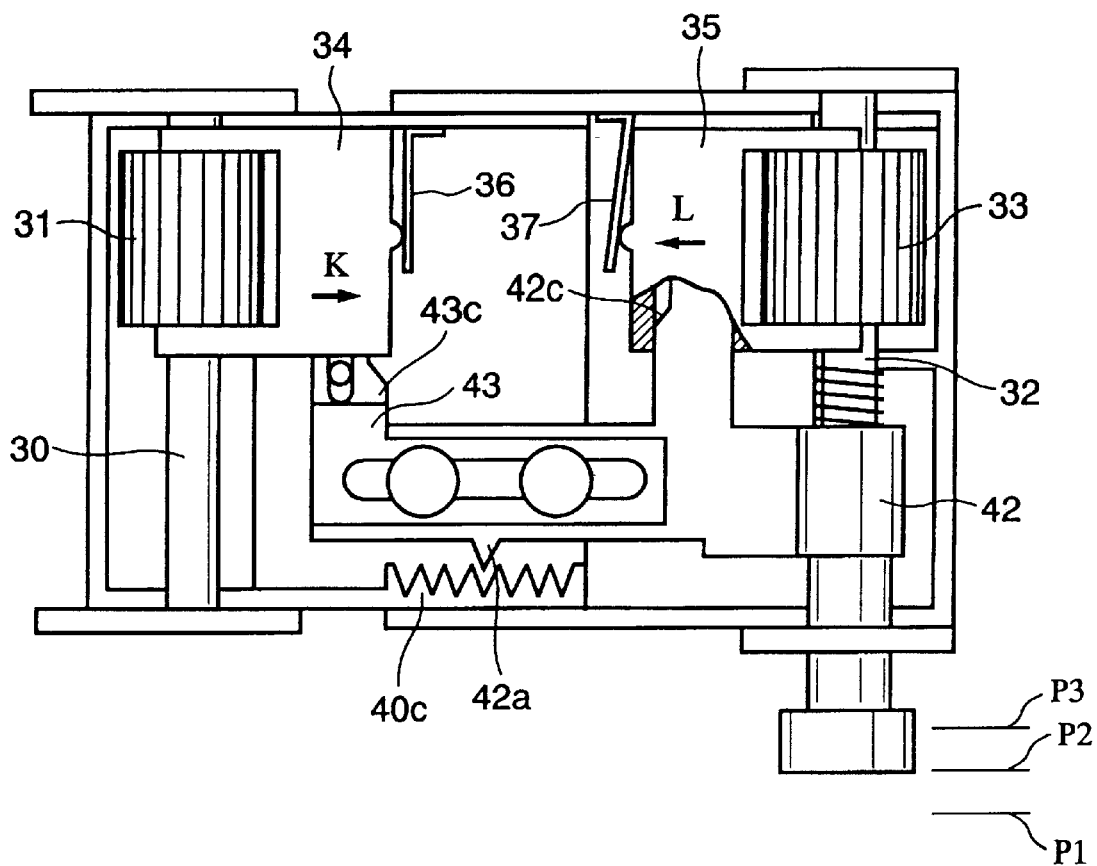
FIG. 18 is a plan view showing an operation of a mechanism in the third embodiment.
Figure 19:
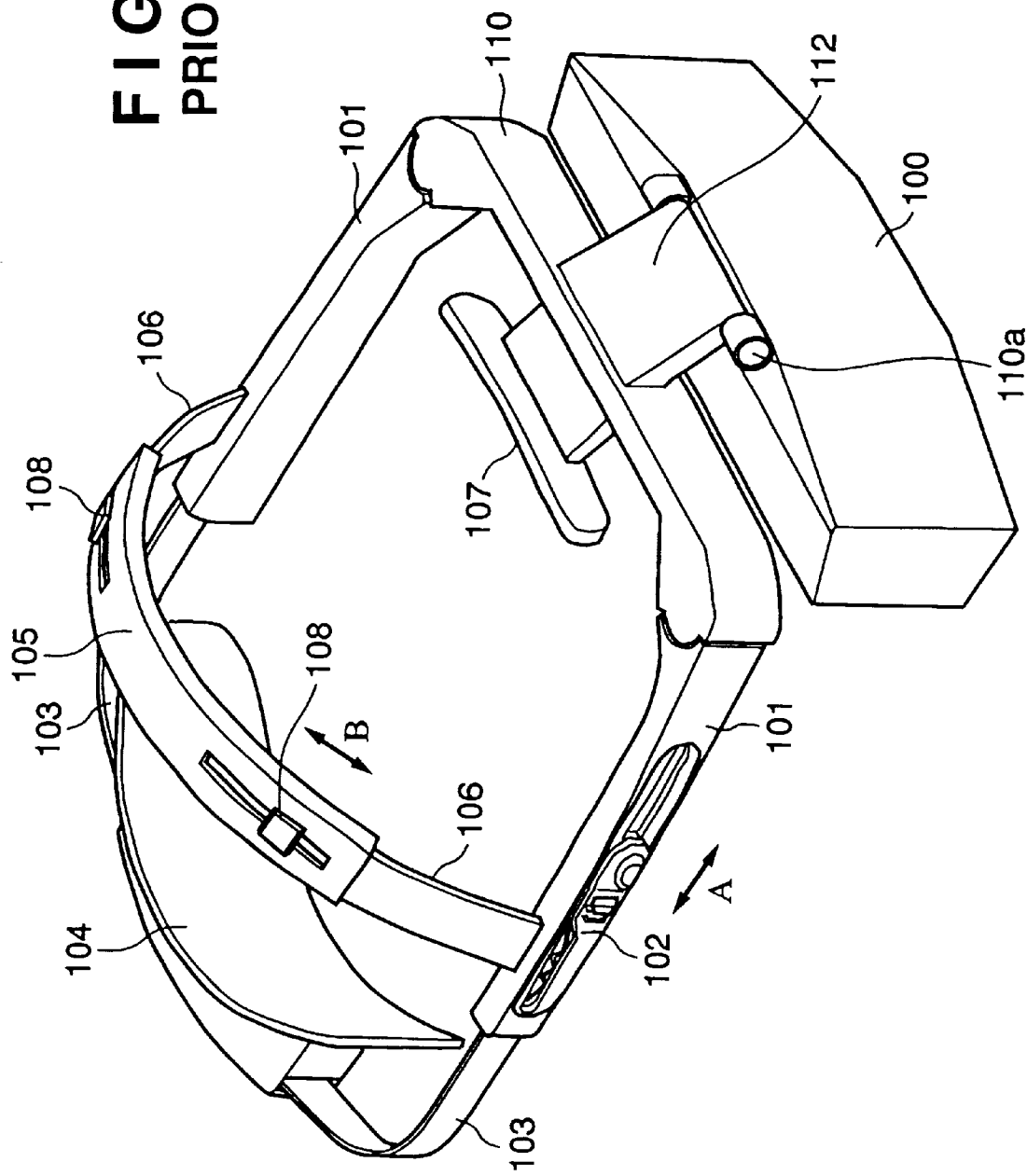
FIG. 19 is a perspective view of a head mount display device in which a conventional position adjusting mechanism is used.
Figure 20:
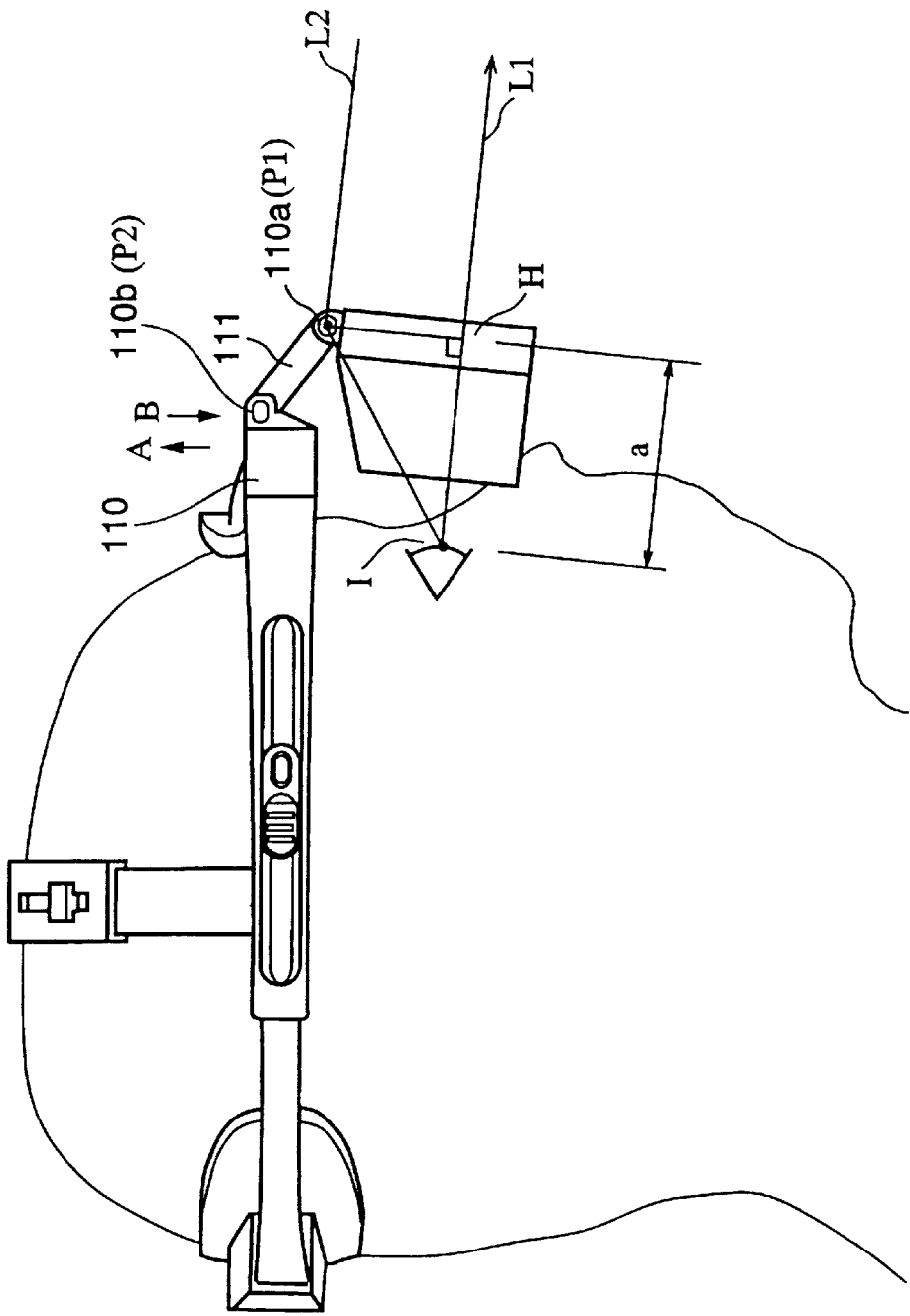
FIG. 20 is a side view showing a state in which the head mount display device shown in FIG. 19 is mounted.

FIG. 17 is a plan view showing a locked state of a connecting member 500 serving as a position adjusting mechanism in this embodiment, and FIG. 18 is a plan view showing a state in which the lock on the side of the display portion 1 is released. In FIG. 17, the unlock button 4 is configured so as to take positions indicated by P1, P2 and P3. When the unlock button 4 is at the position P1 in the figure, the protrusions 34a and 35a of the lock members 34 and 35 engage with the gears 31 and 33, respectively, so that the shafts 30 and 32 are in a locked state. In this embodiment, the start positions of a taper 42c provided at the part of the unlock lever 42 and a taper 43c provided at the part of the lever 43 are shifted by a distance j.

When the unlock button 4 is pressed to the position P2 in the direction indicated by the arrow H, the part of the unlock lever 42 intrudes into the square hole 35c (see FIG. 15) in the lock member 35 as shown in FIG. 18, so that the lock member 35 moves in the direction indicated by the arrow L, by which the lock on the side of the display portion 1 is released. However, the taper 43c provided at the part of the unlock lever 43 still lies on the outside of the square hole 34c (see FIG. 15) in the lock member 34, so that the lock member 34 remains at the lock position. Therefore, the shaft 30 is still in a locked state.

Also, in this state, the chevron-shaped protrusion 42a provided on the unlock lever 42 does not come off completely from the chevron-shaped teeth provided on the member 40 and is in a caught state as shown in FIG. 18. In other words, the member 41 is in a locked state in the direction indicated by the arrow N with respect to the member 40. Therefore, in this state, only the display portion 1 is unlocked, and can be rotated freely with respect to the support shafts 1a and 1b.

Further, when the unlock button 4 is pressed to the position P3, the taper 43c of the unlock lever 43 intrudes into the square hole 34c (see FIG. 15) in the lock member 34 to move the lock member 34 in the direction indicated by the arrow K. Thereby, the shaft 30 is unlocked. At this time, the taper 42c of the unlock lever 42 remains entering in the square hole 35c in the lock member 35, so that the lock of the shaft 30 is kept being released. Also, at this time, the chevron-shaped protrusion 42a provided on the unlock lever 42 comes off completely from the chevron-shaped teeth 40c provided on the member 40, so that the member 41 is in an unlocked state.

Therefore, when the unlock button 4 is pressed to the position P3, the lock of the shafts 30 and 32 is released, and the length of the connecting member 500 can be changed freely without a load.

While in the above embodiments constructions are shown in which the compression spring 39 is used to urge the unlock button 4 in the direction towards the locking position indicated by the arrow M, the compression spring 39 is not necessary.

That is to say, if the plate springs 36 and 37 have forces strong enough to urge the lock members 34 and 35 to the direction towards the locking position indicated by the arrow M, and the length and angle of the tapers are suitably set, the unlock button 4 can be ensured to returned back to the original position by the force with which the plate spring 36 and 37 urges back the lock members.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. A position adjusting mechanism which connects equipment the position of which is to be adjusted to support means for supporting said equipment so as to be movable relatively, comprising:

first movable means connected with said support means;

second movable means connected with said equipment;

first locking means moving between a first position at which said first movable means is locked and a second position at which said first movable means is movable;

second locking means moving between a first position at which said second movable means is locked and a second position at which said second movable means is movable; and moving means for moving said first and second locking means at the same time, said moving means moving between a full locking position at which both of said first and second locking means move to said first position and a full unlocking position at which both of said first and second locking means move to said second position.

2. The position adjusting mechanism according to claim 1, wherein said moving means further has a semi-locking position, at which one of said first and second locking means lies at said first position and the other thereof lies at said second position, between said full locking position and said full unlocking position.

3. The position adjusting mechanism according to claim 1, wherein the length of said position adjusting mechanism is variable, and said moving means has expansion means for changing the length thereof in association with the adjustment of length of said position adjusting mechanism.

4. The position adjusting mechanism according to claim 3, wherein the length of said position adjusting mechanism can be adjusted only in a state in which said moving means lies at said full locking position.

5. The position adjusting mechanism according to claim 1, wherein said position adjusting mechanism further comprises second urging means for urging said first and second locking means toward said respective first positions.

6. The position adjusting mechanism according to claim 1, wherein said first and second movable means have a movable shaft, and said first and second locking means inhibit the rotation of said movable shaft at said first position.

7. A head mount display device using the position adjusting mechanism according to claim 1.

* * * * *

UNITED STATES PATENT AND TRADEMARK OFFICE
CERTIFICATE OF CORRECTION

PATENT NO.    : 6,515,853 B2
DATED         : February 4, 2003
INVENTOR(S)   : Yoshihiro Saito It is certified that error appears in the above-identified patent and that said Letters Patent is hereby corrected as shown below:

Title page,
Item [56], References Cited, FOREIGN PATENT DOCUMENTS,
"JP    9280247 10/1997" should read -- JP  9-280247  9/1997 --.
Item [57], ABSTRACT,
Line 14, "tapers" should read -- taper --.

Column 4,
Line 7, "be:" should read -- be --.

Column 7,
Line 49, "an" should read -- a --.

Column 9,
Line 7, "urge" should read -- urges --.

Signed and Sealed this

Second Day of December, 2003

JAMES E. ROGAN
*Director of the United States Patent and Trademark Office*